(12) United States Patent
Sato et al.

(10) Patent No.: US 10,661,550 B2
(45) Date of Patent: May 26, 2020

(54) MOLDING MATERIAL FOR FORMING STRUCTURE AND MOLDING METHOD

(71) Applicant: FUJIMI INCORPORATED, Kiyosu-shi, Aichi (JP)

(72) Inventors: Kazuto Sato, Kiyosu (JP); Hiroaki Mizuno, Kiyosu (JP); Hiroyuki Ibe, Kiyosu (JP); Fumi Shinoda, Kiyosu (JP); Kyohei Ota, Kiyosu (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 377 days.

(21) Appl. No.: 15/320,855

(22) PCT Filed: Jun. 29, 2015

(86) PCT No.: PCT/JP2015/068725
§ 371 (c)(1),
(2) Date: Dec. 21, 2016

(87) PCT Pub. No.: WO2015/199244
PCT Pub. Date: Dec. 30, 2015

(65) Prior Publication Data
US 2017/0157842 A1    Jun. 8, 2017

(30) Foreign Application Priority Data

Jun. 27, 2014 (JP) .................. 2014-133021

(51) Int. Cl.
*B33Y 40/00* (2020.01)
*B33Y 70/00* (2020.01)
(Continued)

(52) U.S. Cl.
CPC ............ *B33Y 40/00* (2014.12); *B22F 1/0059* (2013.01); *B22F 1/0062* (2013.01);
(Continued)

(58) Field of Classification Search
CPC ........................................ B33Y 40/00
See application file for complete search history.

(56) References Cited

U.S. PATENT DOCUMENTS 5,041,335 A    8/1991   Inai et al.
7,270,879 B2   9/2007   McCrary
(Continued)

FOREIGN PATENT DOCUMENTS

CN    1497017 A    5/2004
EP    0 677 989 A1  10/1995
(Continued)

OTHER PUBLICATIONS

Chinese Office Action issued in application No. 201580035114.2 dated Jul. 3, 2018.
(Continued)

*Primary Examiner* — Larry W Thrower
(74) *Attorney, Agent, or Firm* — Foley & Lardner LLP (57) ABSTRACT

Provided is a material for molding, without a mold, a highly uniform structure comprising a resin and a non-resin such as metals and ceramic. The molding material provided by this invention is formed of a powder comprising a resin and at least one species of non-resin selected among metals and ceramic. The resin material has a uniformity index N below 0.2. N is determined by depositting the powder in a softened or melted state to form a structure in a temperature range between the resin material's minimum molding temperature and maximum molding tempeature+100° C.; measuring the structure's porosity Rn at 12 locations by image analysis; and dividing the variance of porosity Rn by the average porosity Rn. The minimum and maximum molding temperatures are the lowest and highest heater temperatures at which the resin material can be molded at a pressure of 3500 psi by injection molding, respectively.

5 Claims, 1 Drawing Sheet (51) Int. Cl.
*C08J 5/00* (2006.01)
*C08J 3/20* (2006.01)
*B28B 1/30* (2006.01)
*B29C 67/00* (2017.01)
*B33Y 10/00* (2015.01)
*B22F 3/00* (2006.01)
*B22F 1/00* (2006.01)
*B29C 64/00* (2017.01)
*C08K 3/013* (2018.01)
*B33Y 30/00* (2015.01)

(52) U.S. Cl.
CPC ............ *B22F 1/0096* (2013.01); *B22F 3/008* (2013.01); *B28B 1/30* (2013.01); *B29C 64/00* (2017.08); *B29C 67/00* (2013.01); *B33Y 10/00* (2014.12); *B33Y 30/00* (2014.12); *B33Y 70/00* (2014.12); *C08J 3/20* (2013.01); *C08J 5/00* (2013.01); *C08K 3/013* (2018.01); *B22F 2999/00* (2013.01)

(56) References Cited

U.S. PATENT DOCUMENTS

| | | |
|---|---|---|
| 2004/0138363 A1 | 7/2004 | Baumann et al. |
| 2006/0251826 A1 | 11/2006 | Pfeifer et al. |
| 2010/0270713 A1 | 10/2010 | Frangov et al. |
| 2013/0273131 A1 | 10/2013 | Frangov et al. |

FOREIGN PATENT DOCUMENTS

| | | |
|---|---|---|
| JP | H01-280547 A | 11/1989 |
| JP | H09-272153 A | 10/1997 |
| JP | 2000-144205 A | 5/2000 |
| JP | 2004-137503 A | 5/2004 |
| JP | 2005-067998 A | 3/2005 |
| JP | 2009-006294 A | 1/2009 |
| JP | 2009-524732 A | 7/2009 |
| JP | 2012-523325 A | 10/2012 |
| WO | WO-2007/089620 A1 | 8/2007 |

OTHER PUBLICATIONS

Park et al., "Preparation of Poly(4-vinylphenol)/Titanium Dioxide Composite and Its Application as a Gate Dielectric for Organic . . . " Journal of Nanoscience and Nanotechnology, vol. 11, May 2011, pp. 4466-4470.

Office Action issued in corresponding Japanese Patent Application No. 2016-529688, dated Apr. 11, 2019 with English translation.

Office Action issued in corresponging Chinese Application No. 201580035114.2 dated Oct. 11, 2019 with English translation.

Office Action issued in corresponding Japanese Patent Application No. 2016-529688 dated Jan. 9, 2020 with English translation.

MOLDING MATERIAL FOR FORMING STRUCTURE AND MOLDING METHOD

TECHNICAL FIELD

The present invention relates to a material for molding a structure and a molding method. The present application claims priority to Japanese Patent Application No. 2014-133021 filed on Jun. 27, 2014; and the entire contents thereof are incorporated herein by reference.

BACKGROUND ART

As structural materials for forming various structures, conventionally, metal materials and ceramic materials have been used in general because of the properties that can be obtained, such as high strength. Lately, to provide further functionalities to the metal materials and ceramic materials, composites formed with resin materials having various functionalities are used as well.

As the method for molding a structure that comprises a resin material, for instance, cast molding and injection molding are known. In these molding methods, a molding material is heated to a temperature where certain fluidity can be obtained and casted or injected into a mold with a cavity of a desired shape to form a structure in the desired shape. The molding material comprises a thermoplastic resin as the primary component and further comprises, as necessary, other materials such as metals and ceramic besides the thermoplastic resin. For instance, to increase the mechanical strength of the structure, these molding materials are often prepared to include carbon fibers, powders of metal oxides, etc.

Examples of the method for molding a structure without the use of a mold include thermal spraying and three-dimensional (3D) printing (or additive manufacturing). For instance, in thermal spraying, a thermal spray material in a powder form comprising a resin material and a non-resinous material such as metals and ceramic is heated, and the softened or melted thermal spray material is sprayed and deposited on a substrate to form a structure formed of the thermal spray material. For instance, Patent Document 1 discloses that, to supplementally add a second feature, an elemental metal, a metal oxide powder, wear-resistant particles, etc., are further included in a thermal spray powder composition formed of two or more species of thermoplastic resin.

CITATION LIST

Patent Literature

[Patent Document 1] Japanese Patent Application Publication No. 2009-524732 (WO 2007/089620)

SUMMARY OF INVENTION

Technical Problem

As a downside to the injection molding and the like, however, a mold is required for every structure. Another problem is that the mold is highly susceptible to deformation when using an injection molding material that comprises a relatively hard non-resinous material.

In the thermal spraying, the thermal spray material is heated to an extremely high temperature. Thus, the resin material is altered in the thermal spray process. While the resin material may serve as binder, it has been inevitable that some properties inherent to the resin material would be lost or reduced.

As a common problem with all these methods, in the molded structure, significant variance in properties arise between areas formed of the resin material and areas formed of the non-resinous material, making it difficult to obtain a structure with uniform quality. Because, in general, resin materials and non-resinous materials such as metals and ceramic differ greatly in density, the problem tends to be more prominent with decreasing size of the non-resinous material composited into the resin material.

The present invention has been made in view of such circumstances with an objective to provide a molding material with which a highly uniform (uniform-quality) structure can be formed without a mold, with the molding material comprising a resin material and a non-resin material such as metals and ceramic. In another aspect, the present invention provides a molding method using the molding material.

Solution to Problem

To solve the problem, the art disclosed herein provides a molding material (building material) with which a structure can be formed without the need for a mold. The molding material is a powder comprising a resin material and at least one species of non-resinous material selected from the group consisting of metals and ceramic. The resin material is characterized by having a uniformity index N below 0.2 when determined as follows: the powder in a softened or melted state is deposited to form a structure in a temperature range between the minimum molding temperature of the resin material and the maximum molding temperature of the resin material+100° C.; with respect to the resulting structure, porosity Rn is measured at 12 locations by image analysis; the uniformity index is the variance of porosity Rn divided by the average porosity Rn. Here, the minimum molding temperature is the lowest heater temperature at which the resin material can be molded at an injection pressure of 3500 psi by an injection molding machine; the maximum molding temperature is the highest heater temperature at which the resin material can be molded at an injection pressure of 3500 psi by the injection molding machine.

This provides a molding material with which a highly uniform structure can be formed without a mold, with the structure being inhibited from alteration of the resin material while combining the nature inherent to the resin and the properties of the non-resinous material together.

In a preferable embodiment, the molding material disclosed herein is characterized by that the resin material accounts for 20% or more, but 80% or less (by volume) of the resin material and the non-resinous material combined. By this, a structure can be formed, comprising the resin material and the non-resin material blended in accordance with the desired properties.

In a preferable embodiment, the molding material disclosed herein is characterized by being a powder having an average particle diameter of 5 μm or larger, but 200 μm or smaller. By this, the resin material and the non-resinous material can be mixed more evenly, thereby reducing irregularities and variance in the properties of the structure.

As used herein, the "average particle diameter" means, unless otherwise noted, the 50th percentile particle diameter (volume median particle diameter, or abbreviated to $D_{50}$) in its size distribution by volume measured by a particle size analyzer based on laser diffraction/scattering spectroscopy.

In a preferable embodiment, the molding material disclosed herein can be a powder mixture in which particles formed of the resin material (or resin particles) and particles formed of the non-resinous material (or non-resinous particles) are mixed together. Alternatively, it can be a granulated powder obtained by granulation of the resin particles and the non-resinous particles. Here, it is preferable that the resin particles as well as the non-resinous particles have an average particle diameter of 5 µm or larger, but 200 µm or smaller. The molding material can be a composite powder in which the surfaces of the non-resinous particles are provided at least partially with the resin material.

Such variations in composition are preferable because, for instance, even when the resin material and the non-resinous material differ in density, the two can be blended more evenly (homogeneously) in the structure.

In a preferable embodiment, the molding material disclosed herein is characterized by that the resin material is one, two or more species selected from the group consisting of polyolefins, polyvinyl carbonate, polyvinyl phenol, polyurethane, polystyrene, acrylonitrile-butadiene-styrene copolymer, polyethylene terephthalate, and polyamide. While taking advantage of the properties of these resin materials, a structure can be obtained with the properties of the non-resinous material as well.

In a preferable embodiment of the molding material disclosed herein, the resin material is characterized by being antibacterial with an antibacterial activity value of 2.0 or higher. With such a composition, a structure can be obtained, having such antibacterial activity even after it is molded.

In another aspect, the art disclosed herein provides a method for molding a structure. The molding method is characterized by comprising: obtaining a powdered molding material that comprises a resin material and at least one non-resinous material selected from the group consisting of metals and ceramic; and depositing the molding material to form a structure in a prescribed shape without a mold, with the molding material being in a softened or molten state in a temperature range between the minimum molding temperature of the resin material and the maximum molding temperature of the resin material+100° C. Here, the minimum molding temperature is the lowest heater temperature at which the resin material can be molded at an injection pressure of 3500 psi by an injection molding machine (or a heating/pressurizing injector); the maximum molding temperature is the highest heater temperature at which the resin material can be molded at an injection pressure of 3500 psi by the injection molding machine.

This allows for formation of a molding material with which a highly uniform structure can be formed without a mold, with the structure being inhibited from alteration of the resin material while combining the nature inherent to the resin and the properties of the non-resinous material together.

In a preferable embodiment, the structure-molding method disclosed herein is characterized by heating the molding material that is dispersed in a dispersion medium. In such an embodiment, the molding material can be efficiently subjected to molding in accordance with the molding method.

In a preferable embodiment, the structure-molding method disclosed herein is characterized by depositing the molding material by thermal spraying to form the structure. By this, the structure can be formed with more detailed features.

In a preferable embodiment, the structure-molding method disclosed herein is characterized by depositing the molding material by a 3D printer to form the structure. By this, the structure can be molded in a more complex form.

DESCRIPTION OF EMBODIMENTS

Based on a favorable embodiment of this disclosure, the structure-molding method of this disclosure as well as the molding material of this disclosure which can be favorably used in the molding method are described together. Matters necessary to practice this disclosure (e.g. a molding machine and how to use it) other than those specifically referred to in this description may be understood as design matters based on the conventional art in the pertinent field for a person of ordinary skill in the art. The present disclosure can be practiced based on the contents disclosed in this description and common technical knowledge in the subject field.

The structure-molding method disclosed herein is basically characterized by comprising the following steps:
(1) obtaining a powdered molding material that comprises a resin material and at least one non-resinous material selected from the group consisting of metals and ceramic, and
(2) depositing the molding material to form a structure in a prescribed shape without a mold, with the molding material being in a softened or molten state in a temperature range between the minimum molding temperature of the resin material and the maximum molding temperature of the resin material+100° C.

1. Obtaining Molding Material
(Resin Materials)

In the molded structure, the resin material used in the art disclosed herein can serve as binder to bond the non-resinous material and also as a functional material to provide a desired feature to the structure. The resin material is not particularly limited. Various resin materials can be suitably selected depending on the desired features, etc. In particular, for instance, it is preferable to use a thermoplastic resin, a heat-curable resin, etc., which can be favorably molded by heating them.

The thermoplastic resin may encompass, without limitations, a broad range of synthetic resins that provide a level of thermoplasticity that allow thermal molding. As used herein, the "thermoplasticity" refers to properties to reversibly soften when heated to allow for plastic deformation and reversibly harden when cooled. In general, a resin having a chemical structure formed with a linear or branched polymer can be considered. Specific examples include commonly-used resins such as polyvinyl chloride (PVC), polyethylene (PE), polypropylene (PP), polystyrene (PS), thermoplastic polyesters, acrylonitrile-butadiene-styrene (ABS), acrylonitrile-styrene (AS), polymethylmethacrylate (PMMA), polyvinyl alcohol (PVA), polyvinylidene chloride (PVDC), polyethylene teephthalate (PET), and polyvinyl acetate; engineering plastics such as polyamide (PA), polyacetal (POM), polycarbonate (PC), polyphenylene ether (PPE), modified polyphenylene ether (or m-PPE;m-PPO), polybutylene terephthalate (PBT), ultra-high molecular weight polyethylene (UHPE), and polyvinylidene fluoride (PVdF); and super engineering plastics such as polysulfone (PSF), polyether sulfone (PES), polyphenylene sulfide (PPS), polyarylate (PAR), polyamide imide (PAI), polyether imide (PEI), polyether ether ketone (PEEK), polyimide (PI), liquid crystal polymer (LCP), and polytetrafluoroethylene (PTFE). Among them, preferable examples include resins such as polyvinyl chlorides; polycarbonates; polyalkylene terephthalates such as PET and PBT; and PMMA. Among these, any one species can be used solely or a combination of two or more species can be used as well.

(Heat-Curable Resin)

The heat-curable resin encompasses, without limitations, a broad range of synthetic resins that undergo polymerization with formation of a polymeric network and irreversibly cures when heated. As used herein, the "heat curability" refers to curing properties such that a reaction occurs in the polymer, whereby crosslinking occurs to form a network. Specific examples include phenolic resin (PF), epoxy resin (EP), melamine resin (MF), urea resin (UF), unsaturated polyester resin (UP), alkyd resin, polyurethane (PUR), and heat-curable polyimide (PI). Among them, resins such as phenolic resin, epoxy resin and polyurethane resin are preferable. Particularly preferable resins include phenolic resins such as polyvinyl phenol (PVP) and novolac phenolic resins; epoxy resins such as bisphenol A epoxy resin, bisphenol F epoxy resin and biphenyl epoxy resin; and polyurethanes such as polyurethane foam and polyurethane elastomer. The heat-curable resin can be present as, for instance, a mixture of low molecular weight monomers or a polymer formed upon a certain degree of polymerization (partial polymerization). These can be used singly as one species or in a combination (including a blend) of two or more species.

(Non-Resinous Materials)

In the molded structure, the non-resinous material used in the art disclosed herein can serve, along with the non-resinous material, as a functional material to provide desirable properties to the structure. The non-resinous material is not particularly limited. Among various metal materials, ceramic materials and so on, various materials can be suitably selected and used in accordance with the desirable properties, etc.

(Metals)

The metal material can be various elemental metals or their alloys. The alloy referred to here encompasses a substance that is formed of a metal and at least one other element and has metallic properties; they may be mixed as a solid solution, an intermetallic compound, or a mixture of these. When the metal material is an alloy, the number of elements (atomic species) forming the alloy is not particularly limited. For instance, it can be formed of two species (a two-element alloy), or three or more species (three- or more element alloy). Specific examples of metals forming the metal material include metalloids such as B, Si, Ge, Sb, and Bi; typical elements such as Mg, Ca, Sr, Ba, Zn, Al, Ga, In, Sn, and Pb; transition metals such as Sc, Y, Ti, Zr, Hf, V, Nb, Ta, Cr, Mo, W, Mn, Fe, Co, Ni, Cu, Ag, and Au; lanthanoids such as La, Ce, Pr, Nd, Er, and Lu.

(Ceramic)

The ceramic material is not particularly limited. Examples include oxide-based ceramic formed of metal oxides, nitride-based ceramic formed of metal nitrides, and carbide-based ceramic formed of metal carbides as well as ceramic materials formed of borides, fluorides, hydroxides, carbonates and phosphates of metals. The metals forming the ceramic can be, for instance, the metals listed above.

In particular, typical examples of the ceramic materials include oxide-based ceramic such as silica ($SiO_2$), magnesia (MgO), calcia (CaO), strontium oxide (SrO), scandium oxide ($Sc_2O_3$), yttria ($Y_2O_3$), lanthanum oxide ($La_2O_3$ titania ($TiO_2$), zirconia ($ZrO_2$), hafnia ($HfO_2$), vanadium oxide ($VO_X$, e.g. $V_2O_5$, etc.), niobium oxide ($Nb_2O_3$ tantalum oxide ($Ta_2O_5$) chromium oxide ($CrO_X$, e.g. $Cr_2O_4$, etc.), tungsten oxides ($WO_X$, e.g. $WO_2$, $WO_3$, etc.), manganese oxides ($MnO_X$, e.g. MnO, $MnO_2$, $Mn_3O_4$, etc.), iron oxide ($FeO_X$, e.g. $Fe_2O_3$, etc.), cobalt oxide ($CoO_X$, e.g. $Co_2O_3$, etc.), nickel oxide (NiO), copper oxide (CuO), silver oxide (AgO), zinc oxide (ZnO), alumina ($A_2O_3$), gallium oxide ($Ga_2O_3$), indium oxide ($In_2O_3$), tin oxide ($SnO_2$), bismuth oxide ($BiO_X$, e.g. $Bi_2O_3$, etc.), ceria ($CeO_2$), praseodymium oxides ($PrO_X$), neodymium oxide ($Nd_2O_3$), erbium oxide ($Er_2O_3$), lutetium oxide ($Lu_2O_3$), germanium oxide ($GeO_2$), and antimony ($Sb_2O_5$); nitride-based ceramic such as silicon nitride ($Si_3N_4$), aluminum nitride (AlN), boron nitride (BN), sialon ($Si_3N_4$—AlN—$Al_2O_3$ solid solution), carbon nitride ($CN_x$), and titanium nitride (TiN); carbide-based ceramic such as silicon carbide (SiC) and tungsten carbide (WC); composite oxide-based ceramic such as cordierite ($2MgO.2Al_2O_3.5SiO_2$), mullite ($3Al_2O_3.2SiO_2$), spinel ($MgO.Al_2O_3$, and zircon ($ZrSiO_X$, e.g. $ZrSiO_4$, etc.). Here, typical compositions of the ceramics are shown together, but the ceramic materials disclosed herein are not necessarily limited to these compositions. For instance, to obtain desired properties, etc., various other atomic elements may be added or composites can be formed from these. These ceramic materials can be used singly as one species or in a combination of two or more species.

(Functionalities)

With respect to the resin material, metal material and ceramic material described above, at least one of them preferably has an arbitrary functionality. In the structure-molding method disclosed herein, the subsequent molding process is carried out at a low temperature; and therefore, their functionalities can be maintained in the structure as well. The functionality is not particularly limited. Examples include high strength, high hardness, high toughness, high elasticity, high ductility, heat resistance, wear resistance, biodegradability, conductivity, piezoelectricity, antibacterial activity, optical transparency, hydrophilicity, polarizability, non-stick properties, photochromic properties, photocatalytic properties, biological functions, design features (e.g. color tone, glossiness, etc.), anti-discoloration properties, and weatherability (light resistance).

These functionalities can be inherent to the resin material, metal material and ceramic material, or can be added to the materials, for instance, by treatment with other chemicals, etc.

For instance, with respect to the antibacterial activity, it can be the antibacterial activity that a polyvinyl phenol resin or the like inherently has due to its phenol moiety; the inherent antibacterial activity of silver, copper, zinc, etc.; or an antibacterial activity acquired by the materials upon addition of various antibacterial agents.

For instance, with respect to the aesthetic appearance including the color tone, it can be the color tone that a ceramic material such as alumina and zirconia, etc., inherently has due to its composition, crystal structure and so on; or the color tone that a resin material inherently has due to its composition and structure. Alternatively, it can be a color tone acquired by these materials upon addition of various colorants and pigments.

(Antibacterial Activity)

In a preferable embodiment of the art disclosed herein, the resin material has an antibacterial activity value of 2.0 or higher, especially when the resin material is susceptible to thermal alteration. The antibacterial activity is favorably maintained in the structure obtained in the subsequent molding step. With respect to the antibacterial activity, the antibacterial activity value is more preferably 3.0 or higher, or yet more preferably 5.0 or higher.

As used herein, the antibacterial activity value is the difference in the number of live bacteria between a product tested (e.g. a product processed to have antibacterial activity) and a reference product (e.g. an unprocessed product) after their bacteria are incubated and cultured based on JIS Z2801:2012 (JIS R1702:2012 for a ceramic material). When the antibacterial activity value is 2.0 or higher, that is, when the death rate is 99% or higher, it is found to have antibacterial effects (antibacterial activity).

(Color Tone)

In a preferable embodiment of the art disclosed herein, at least one species among the resin material, metal material and ceramic material has a desirable color tone (color, tint). In particular, it is preferable that a ceramic material is included, with the ceramic material selectively absorbing visible light with a specific wavelength to have a vivid color. The ceramic material is not particularly limited. It may have a color from the color tone based on its composition and crystal structure, or it may comprise a transition element (possibly in an ion form) as the colorant, such as titanium (Ti), vanadium (V), chromium (Cr), manganese (Mn), iron (Fe), cobalt (Co), nickel (Ni) and copper (Cu). Such ceramic materials are susceptible to unintended color change due to a change in the crystal structure, etc., occurring when heated. However, according to the art disclosed herein, in the structure obtained in the subsequent molding step, the color tone of the ceramic material is favorably maintained, whereby discoloration is inhibited. With respect to these colored materials, a material with one color may be used, or two or more materials with different colors may be used separately or as a mixture.

As used herein, the "color tone" indicates the color tones (colors) of the resin material, metal material and ceramic material in terms of, for instance, hue, lightness, saturation, etc. The color can be assessed by, for instance, human sensory evaluation, or it can be specified and evaluated based on the color specification defined in JIS Z 8730:2009, etc. Human sensory evaluation allows more practical testing with weighting given to the properties, applications, etc., of the tested object. By the color specification, for instance, a color can be numerically expressed as a tri-stimulus value and converted to uniform color space (UCS) to specify the color by L*a*b* color space, etc., whereby more objective evaluation is possible. Here, for the L*a*b* color space (also CIE1976 (L*a*b*) or CIELAB), the value measured by a color difference meter can be used.

For the molding material, a powder can be used. The powder can be in various embodiments. Specific examples include (a) a powder mixture in which the resin particles and the non-resinous particles are mixed, (b) a granulated powder obtained by granulation of the resin particles and the non-resinous particles, and (c) a composite powder in which the resin material is provided at least partially to the surfaces of the non-resinous particles.

(a. Powder Mixture)

The powder mixture here is a mixture of the resin particles and the non-resinous particles. The shapes of these particles are not particularly limited. When particles are sufficiently small (fine) in size relative to the largest dimension of the structure (e.g. as small as or smaller than 1/1000 of the largest dimension of the structure), these particles can be included in the particles according to this disclosure. The shapes of the particles can be spherical, polygonal with corners, clumpy with no corners, irregular shapes, etc. Alternatively, for instance, they can be prismatic, flaky, needle-like, fibrous, etc.

The dimensions of these particles are not limited. For instance, they can be adjusted in accordance with the properties desired in the resulting structure, the composition of the molding system, etc. For instance, from the standpoint of the uniform dispersion of the two materials in the structure, it is preferable that the resin particles and the non-resinous particles are approximately equisized. Thus, roughly, the maximum average particle diameters of these particles can be, for instance, about 50 μm or smaller, preferably 40 μm or smaller, or more preferably about 35 μm or smaller. The minimum average particle diameters are not particularly limited, either. In view of the handling of the molding material being a powder, they can be, for instance, 0.5 μm or larger, preferably 1 μm or larger, or more preferably 5 μm or larger, for instance, 10 μm or larger.

The molding material in such a powder form can be subjected to molding as a slurry (or suspension, ink, etc.), dispersed in a suitable liquid medium. This embodiment is preferable because finer particles can be used and also because portions formed from the resin material and portions formed from the non-resinous material are present, more evenly dispersed. When preparing such a slurry, the average particle diameters of the respective powders are not strictly limited. For instance, they can be about 10 μm or smaller, preferably 8 μm or smaller, or more preferably about 5 μm or smaller. Their minimum average particle diameters are not particularly limited, either. For instance, they can be 0.01 μm or larger, or preferably 0.1 μm or larger, for instance, 1 μm or larger.

(b. Granulated Powder)

The granulated powder here is formed with granulated particles (particles having larger particle diameters), with the granulated particles being formed from the resin particles and the non-resinous particles bonded to each other. The shapes of the resin particles and the non-resinous particles as well as the shapes of the granulated particles are not particularly limited and can be the same as in the powder mixture. For instance, such a granulated powder can be obtained by wet- or dry-mixing a binder along with resin particles and non-resinous particles having finer particle diameters at a prescribed ratio followed by sifting, etc., as necessary. Alternatively, without using a binder, the resin particles may be provided to the non-resinous particles so as to bond several non-resinous particles together to form granulated particles (granulated powder) at large.

The resin particles and the non-resinous particles forming the granulated powder may have approximately the same average particle diameter or one of them can be prepared larger (or smaller) on purpose. From the standpoint of forming a more uniform structure, it is preferable that their average particle diameters are about equal and are both sufficiently smaller than the average particle diameter of the granulated powder (i.e. the average particle diameter of the molding material). The average particle diameters (or the average primary particle diameters) of the resin particles and non-resinous particles can be, for instance, roughly about 1/1000 to 1/10 (preferably 1/800 to 1/50, e.g. 1/500 to 1/100) of the average particle diameter (or the average secondary particle diameter) of the granulated powder. They are not necessarily limited to these ranges, but more specifically, they are preferably 0.5 nm or larger, but 20 μm or smaller; more preferably 50 nm or larger, but 10 μm or smaller; or particularly preferably 0.5 μm or larger, but 5 μm or smaller.

As the binder, it is preferable to use a species that can be removed by volatilization or decomposition in the subsequent heating step. The binder is not particularly limited. Preferable examples include aqueous polymer binders such as polytetrafluoroethylene (FTFE), carboxymethyl cellulose (CMC), and styrene-butadiene rubber (SBR); halogenated vinyl resins such as polyvinylidene fluoride (PVDF) and polyvinylidene chloride (PVDC); polyalkylene oxides such as polyethylene oxide (PEO); non-aqueous polymer binders such as acrylic resins. The binder is not particularly limited. A polymer binder that can be present as particles or fibers in the granulated powder to bond the particles can be favorable used.

The granulation method is not particularly limited. Various known granulation methods can be employed. In particular, for example, one or more methods can be used among tumbling granulation, fluidized bed granulation, high shear granulation, compression granulation, extrusion granulation, crushing granulation, and spray drying. The spray drying may be preferable. By this, the resin particles and non-resinous particles can be favorably granulated to prepare a granulated powder. The average particle diameter of the granulated powder is not particularly limited. It can be, for instance, about 100 μm or smaller, preferably 50 μm or smaller, or more preferably about 30 μm or smaller. The minimum average particle diameter is not particularly limited, either. In view of the handling of the molding material being a powder, it can be, for instance, 5 μm or larger, preferably 10 μm or larger, or more preferably 15 μm or larger, for instance, 20 μm or larger.

(c. Composite Powder)

The composite powder is in an embodiment having the resin material provided at least partially on surfaces of the non-resinous particles. The shapes of the non-resinous particles are not particularly limited and can be the same as in the powder mixture. The non-resinous particles should be coated with the resin material at least partially on the surfaces; they can be coated entirely over the surfaces. The way of coating is not particularly limited. The non-resinous particle surfaces may be provided with an approximately uniform layer of the resin material. For instance, the non-resinous material and the resin material may be in layers. Alternatively, for instance, particles or clumps of the resin material may be integrally provided to the non-resinous particle surfaces. Here, one, two or more resin materials in particles or clumps can be provided.

The method for producing the composite powder is not particularly limited. It can be produced by obtaining particles of the non-resinous material and providing their surfaces at least partially with the resin material in a prescribed form or coating their surfaces with the resin material in an irregular form, etc. Alternatively, the resin material can be applied, adhered, etc., to, for instance, a sheet of the non-resinous material to obtain a composite laminate and the composite laminate can be then crushed, etc., to obtain a composite powder in a suitable particle size range. The average particle diameter of the composite powder is not particularly limited, either. For instance, it is preferably about the same as that of the granulated powder.

In the molding material above, the ratio of the resin material to the non-resinous material contained is not particularly limited and can be suitably adjusted so that desirable properties can be exhibited in the structure. The ratio of the resin material to the resin material and non-resinous material combined can be adjusted in a range of, for instance, 20% by volume or higher, but 80% by volume or lower. For instance, from the standpoint of more effectively bringing about the properties of the non-resinous material in the structure, for instance, the resin material content can be 20% by volume or higher, but 50% by volume or lower (preferably 20% by volume or higher, but 40% by volume or lower). For instance, from the standpoint of more effectively bringing about the properties of the resin material in the structure, for instance, the resin material content can be 50% by volume or higher, but 80% by volume or lower (preferably 60% by volume or higher, but 80% by volume or lower).

2. Heating and Molding of Molding Material

In the art disclosed herein, the molding material obtained above is deposited in a softened or melted state in a temperature range between the minimum molding temperature of the resin material and the maximum molding temperature of the resin material+100° C. By this, the softened or melted molding material is allowed to cool, whereby the powder particles of the molding material are bonded to one another to form a structure as a hardened body.

The minimum molding temperature of the resin material is defined as the lowest heater temperature at which the resin material can be molded at an injection pressure of 3500 psi by an injection molding machine; the maximum molding temperature is defined as the highest heater temperature at which the resin material can be molded at an injection pressure of 3500 psi by the cylinder molding machine. The heater temperature is the temperature of the mold of the molding material in the injection molding machine, measured with a thermocouple.

As the injection molding machine here, for instance, a pressurizing sample maker equipped with hydraulic pressurizing and heating systems can be preferably used; such a sample maker is widely used for preparing pelletts for observations or examinations. For instance, it is preferable to use mounting equipment with which a specimen for observations can be mounted in a resin material. The dimensions of the molded body (inside dimensions of the mold) are not particularly limited. For instance, the diameter can be about 20 mm to 50 mm (the thickness can be adjusted in a range of, for instance, about 10 mm to 100 mm depending on the specimen volume).

In this embodiment, the minimum and maximum molding temperatures are measured, using SIMPLIMET 3000 available from Buehler as the injection molding machine. In SIMPLIMET 3000, for instance, the temperature of the mold for the molding material can be adjusted by 10° C. increment in a range of about 50° C. to 180° C. Whether or not it is moldable can be determined by whether or not the molding material forms a solid (molded body) in a pellet form (i.e. when it can be molded, the molding material forms a solid in a pellet form). In particular, below the minimum molding temperature, the molding material is not suitably softened or melted; and therefore, the molding material is just pressed together (consolidated) while still in the powder form; after molded, the pressed powder will break down, not being able to maintain the shape. For instance, the moldability of a resin material can be determined by gently placing a 100 g cylindrical weight at the center of the upper face of the molded body and finding out whether or not the shape is maintained without deformation such as sinking and breaking. In this embodiment, moldability is tested by placing an OIML standard weight (cylindrical, class F1, bottom diameter 22.0 mm; available from Murakami Koki Co., Ltd.) conforming to JIS B7609:2008 on a body molded from 14 g of a resin material using a mold of 25 mm diameter. With respect to the maximum molding temperature, above this temperature, the molding material undergoes alteration/decomposition or begins to cure (e.g. when comprising a heat-curable resin as the resin material), whereby it is not suitably softened or melted; and therefore, the molding material may result in dysfunctionality (alteration/decomposition of the resin material) after molded or it may be difficult to inject the molding material in the first place; and therefore, it can be found unmoldable. For instance, whether or not the resin material has been altered can be judged by determining the presence of decomposition products, alterated substances, etc., by analyzing the molding material and the molded body by a suitable method (e.g. X-ray diffraction (XRD), Auger electron spectroscopy (AES), X-ray photoelectron spectroscopy (XPS), Fourier transform infrared spectroscopy (FT-IR), energy-dispersive X-ray spectroscopy (EDX), wavelength-dispersive X-ray spectroscopy (WDX), time-of-flight secondary ion mass spectrometery (TOF-SIMS), hardness measurement, etc.).

Figure 1:
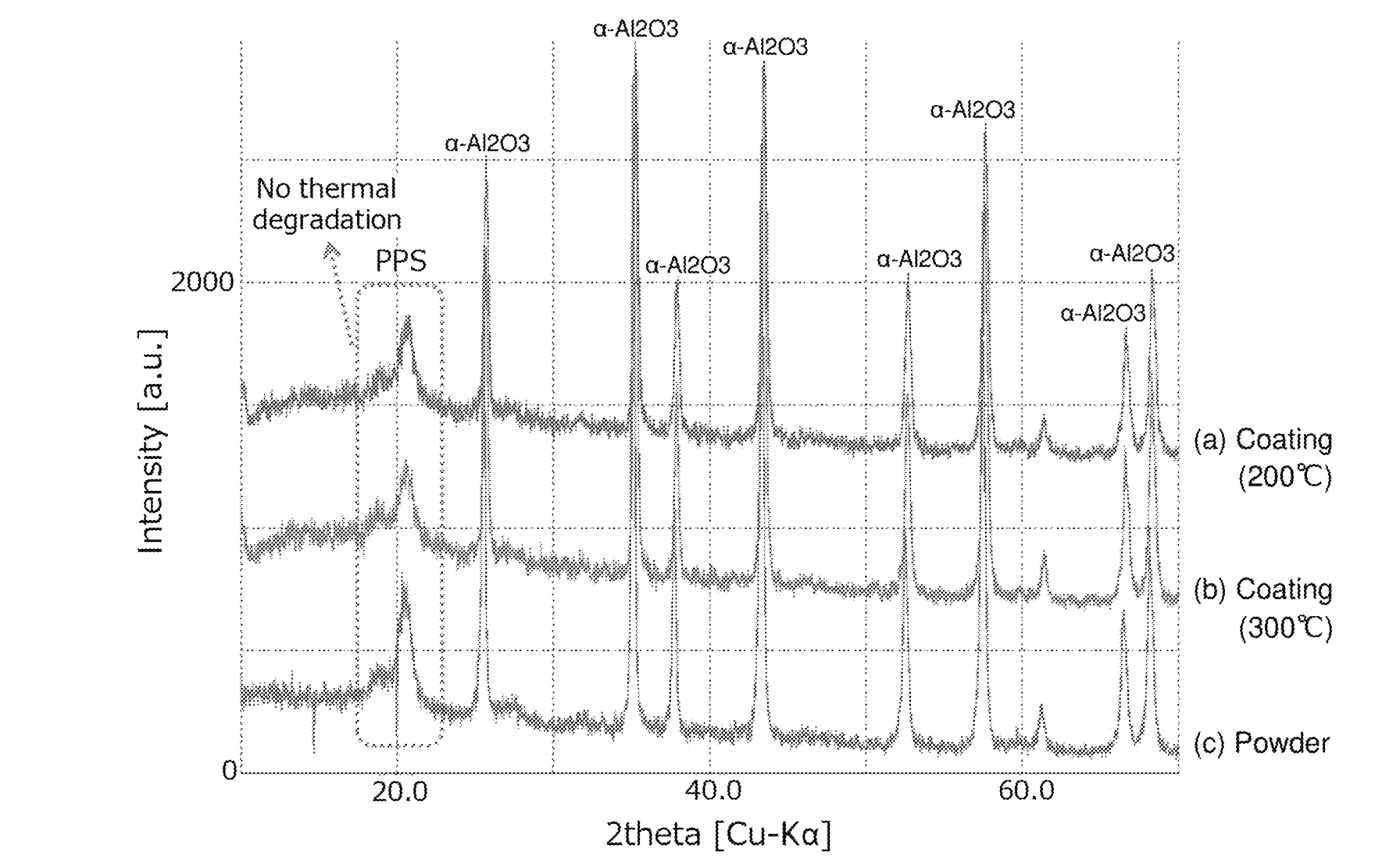
FIG. 1 shows examples of XRD patterns of (a), (b) the coatings and (c) the molding material according to an embodiment of this invention.

As an example, the maximum molding temperature of the resin material is briefly described. FIG. 1 shows the XRD analysis data of (c) the molding material and thermal spray coatings (a) and (b) which are structures obtained by subjecting the molding material to a thermal spray process (cold spraying) at thermal spray temperatures of (a) 200° C. and (b) 300° C. (both at or below the maximum molding temperature of the resin material (PPS) in the molding material). As shown in FIG. 1, when the molding material is molded at a suitable temperature, the diffraction peaks belonging to the resin material (PPS) remain in the thermal spray coatings as well; that is, no alteration or decomposition of the resin material has occurred between before and after the heating and molding processes. If the resin material is decomposed, the peaks of the resin material will be smaller or absent, or peaks of decomposition products may appear in some cases. The occurrence of alteration and decomposition of the resin material can be thus detected. In determining the maximum molding temperature, results of such analysis can be used.

The molding material is a granulated powder obtained by granulating a 1:1 (by volume) mixture of alumina ($Al_2O_3$, average particle diameter 2 Gm) being the non-resinous material and polyphenyl sulfide (PPS, average particle diameter 3 μm) being the resin material. The suitable molding temperature range of this molding material is 150° C. to 320° C. and the uniformity index N is 0.15. The average particle diameter is 30 μm and the particle size range is 15 μm to 45 μm. These indicate that by subjecting the molding material to cold spraying (a thermal spray process) at (a) 200° C. and (b) 300° C. (both in the suitable molding temperature range), thermal spray coatings formed of the $Al_2O_3$/PPS composite material can be obtained. These thermal spray coatings have been found to have good hardness, each having $Hv_{0.05}$ of 30 at a cross section thereof.

The minimum and maximum molding temperatures described above will vary depending on the chemical composition and other conditions of the resin material of interest. Even with resin materials represented by the same chemical composition, these temperatures may vary depending on the number average molecular weight, etc. These temperatures of typical resin materials are shown below as "the minimum molding temperature to the maximum molding temperature":

polypropylene 180° C. to 300° C.
polyvinyl phenol 160° C. to 230° C.
ABS resin 200° C. to 260° C.
polyamide 240° C. to 290° C.
silicon resin 140° C. to 180° C.
melamine resin 150° C. to 560° C.
PPS 150° C. to 320° C.

It is noted that hereinafter, in this description, the temperature range "from the minimum molding temperature to the maximum molding temperature+100° C." may be simply referred to as the "moldable temperature range."

Here, the method for depositing the softened or melted molding material is not particularly limited. For instance, the molding material is heated to reach a prescribed moldable temperature range where it can be flee-flowing or in a softened/melted state; and then, the free-flowing or softened/melted molding material is supplied and deposited onto a substrate. Alternatively, for example, the molding material in the powder form is supplied to the substrate and then heated to reach the moldable temperature range. The depositting process here is not limited to depositting the molding material into the desired structural shape at one time; the process may include repeating to deposit the molding material in layers to form the desired structural shape.

No particular limitations are imposed on the method for supplying the molding material in the powder form or in the free-flowing or softened/melted state. For instance, any of the following can be used: a supply method in which the molding material is supplied to the substrate while staying in contact with the supply device and a supply method in which the molding material is supplied via being free from any contact upon release from the supply device. Examples of these supply methods include various direct or indirect coating methods, printing methods, spraying methods, and thermal spraying methods.

The method for heating the molding material to reach an aforementioned state is not particularly limited, either. For instance, heat can be added by thermal conduction from a heat source, convection (conduction via a medium), emission (radiation), a combination of two or more of these, etc. Examples of these heating methods include direct heating with flame, plasma flame, high temperature gas, etc.; heating by heat transfer using a heating means such as an electric furnace; and heating by radiation of infrared light, UV light, laser light, etc.

As described above, the heating temperature is the minimum molding temperature of the resin material in the molding material or higher. This is preferable because when heated to the minimum molding temperature or a higher temperature, the molding material gains suitable fluidity and can be supplied to a substrate to obtain a compact (dense) deposit. The heating temperature depends also on the supply method used; however, generally as described above, it can be selected based on the temperature range in which it can be molded by conventional injection molding. The molding material is heated preferably at or above the minimum molding temperature or more preferably at or above the minimum molding temperature+20° C. The maximum heating temperature can be the resin material's maximum molding temperature+100° C. or lower. It can be thought that such a temperature is in a temperature range of about 500° C. or below although it may also depend on the resin material in the molding material. When the molding material is deposited at a relatively low temperature where the resin material does not undergo alteration, the structure may also exhibit the properties inherent to the resin material. The heating temperature is preferably the maximum molding temperature+80° C. or lower, or more preferably the maximum molding temperature+50° C. or lower.

A favorable embodiment of the structure-molding method of this disclosure is described more in detail below, with an example employing a thermal spraying method as the supply method.

(Thermal Spraying)

Thermal spraying is a method in which a thermal spray material (the molding material as referred to herein) in a powder form is softened or melted and sprayed to form a deposit of the material. As the thermal spraying method, because the molding material is deposited at or below 500° C. as described above, a thermal spraying method that operates at a lower temperature can be preferably used. Typical examples of the thermal spraying method include cold spraying, low-temperature atmospheric plasma spraying, and a cold plasma method.

For example, cold spraying is a technology in which the working gas heated to a temperature below the melting or softening point is accelerated to ultrasonic speed and with the accelerated working gas, the thermal spray material in the solid phase is allowed to collide at a high speed with a substrate without melting so as to form a deposit. In the cold spraying method, by using the molding material as the thermal spray material, the resin material in the molding material can be heated to soften and deposited along with the non-resinous material onto the substrate. Cold spraying is preferable in view that a highly compact structure can be obtained because the softened molding material is sprayed at a high speed to the substrate. The structure can be molded to have a porosity of, for instance, 10% or lower, more preferably 7% or lower, yet more preferably 5% or lower, or particularly preferably 3% or lower, for instance, 1% or lower.

As used herein, the porosity refers to the proportion of pores in the structure determined by image analysis with respect to a cross-sectional image of the structure. For instance, porosity can be determined as follows: the structure is sliced by a plane perpendicular to the substrate surface; the resulting cross section is embedded in resin and polished; subsequently, using a digital microscope (e.g. VC-7700 available from Omron Corporation) or the like, an image (e.g. 490× magnification) of the cross section is obtained; the cross-sectional image is analyzed by image processing software (e.g. IMAGE PRO available from Nippon Roper K. K.) to determine the surface area of pores in the cross-sectional image and then determine the proportion of the pores in the total cross-sectional area.

The thermal spraying conditions for cold spraying can be selected in accordance with typical methods. Cold spraying methods can be classified into low-pressure cold spraying when the maximum working gas pressure is 1 MPa and high-pressure cold spraying when the maximum working gas pressure is 5 MPa. In high-pressure cold spraying, an inert gas (mainly helium, nitrogen, or a mixture of these) is used as the working gas. In low-pressure cold spraying, the same gas species as those used in high-pressure cold spraying or compressed air are used as the working gas. In the art disclosed herein, because a molding material comprising various types of materials is used as the thermal spray material, low-pressure cold spraying is more preferably selected.

When a structure is molded by high-pressure cold spraying, the working gas is supplied to the cold spray device at a pressure of preferably 0.5 MPa to 5 Mpa (more preferably 0.7 MPa to 5 MPa, yet more preferably 1 MPa to 5 MPa, or particularly preferably 1 MPa to 4 MP) and heated to the prescribed temperature. The working gas is then supplied with the molding material. The supply rate of the molding material is not particularly limited. It is supplied at a rate of preferably 1 g/min to 200 g/min, or more preferably 10 g/min to 100 g/min. The molding material is preferably supplied to the working gas in the same axial direction (from the back of the same axis) as the working gas. When spraying, the distance from the nozzle tip of the cold spray device to the substrate (spray distance) is preferably 5 mm to 200 mm, or more preferably 10 mm to 100 mm. The traverse speed of the nozzle of the cold spray device is preferably 1 mm/sec to 300 mm/sec, or more preferably 10 mm/sec to 150 mm/sec. The thickness of the structure formed at one time is, for instance, preferably 50 μm to 1000 μm, or more preferably 100 μm to 500 μm. Once a structure (a partial structure) is molded and stabilized, the molding material may be further deposited on the surface to mold the final structure in several steps.

When a structure is molded by low-pressure cold spraying, the working gas is supplied to the cold spray device at a pressure of preferably 0.3 MPa to 0.9 Mpa (more preferably 0.4 MPa to 0.6) and heated to the prescribed temperature. The working gas is then supplied with the molding material. The supply rate of the molding material is not particularly limited. It is supplied to the working gas at a rate of preferably 1 g/min to 100 g/min, or more preferably 10 g/min to 100 g/min, preferably in the same axial direction as the working gas. When spraying, the distance from the nozzle tip of the cold spray device to the substrate (spray distance) is preferably 5 mm to 100 mm, or more preferably 10 mm to 40 mm. The traverse speed of the nozzle of the cold spray device is preferably 1 mm/sec to 300 mm/sec, or more preferably 5 mm/sec to 150 mm/sec. The thickness of the structure formed at one time is, for instance, preferably 50 μm to 1000 μm, more preferably 100 μm to 500 μm, or yet more preferably 100 μm to 300 μm. Once a structure (a partial structure) is molded and stabilized, the molding material may be further deposited on the surface to mold the final structure in several steps.

For low-pressure cold spraying, when compressed air is mainly used as the working gas, the working gas is supplied to the cold spray device at a pressure of preferably 0.3 MPa to 1 MPa (more preferably 0.5 MPa to 1 MPa, or most preferably 0.7 MPa to 1 MPa) and heated to the certain temperature. Other conditions can be the same as when the inert gases are used as the working gas.

For instance, in thermal spraying, the molding material as the thermal spray material can be supplied to a thermal spraying device, not in the original powder form, but in a form of slurry with the molding material dispersed in a suitable dispersion medium. In the cold spraying, atmospheric plasma method, cold plasma method, etc., a dispersion medium comprising an organic solvent is preferably used as the medium to disperse the molding material. Examples of the organic solvent include alcohols such as methanol, ethanol and isopropanol as well as toluene and kerosene. The dispersion medium can be a mixture of water and an organic solvent as long as it comprises an organic solvent.

The molding material content in the slurry is not particularly limited. For instance, the solid content is preferably 10% by mass or higher, more preferably 20% by mass or higher, or particularly preferably 30% by mass or higher. This makes it easy to increase the dimension (thickness) of the structure produced per unit time period from the molding material supplied as the slurry, that is the efficiency of thermal spraying.

The molding material content in the slurry is preferably 85% by mass or lower, more preferably 70% by mass or lower, or yet more preferably 50% by mass or lower. Here, the slurry can be prepared with necessary fluidity suited for its supply to a certain thermal spraying device.

(3D Printing)

Another favorable embodiment is described in detail with an example where 3D printing is used as the supply method.

3D printing is a method in which a softened or melted molding material is deposited in layers in accordance with a desired 3D shape to form a structure from the material. In the art disclosed herein, the molding material can be softened or melted before deposited, or can be deposited and then softened or melted. Alternatively, the molding material can be softened or melted while being deposited. Furthermore, a linear material (e.g. a material in a form of wire, rod, etc.) can be prepared from the molding material disclosed herein and the linear material can be melted and deposited.

For instance, when the molding material is softened or melted before deposited, it can be done in the following procedures: the molding material in the powder form is softened or melted and then supplied to the discharging device (molding head) in additive manufacturing equipment; while the discharging device is moved in the X-axis and Y-axis directions at a high speed and the molding table is suitably elevated in the Z-axis direction, the softened or melted molding material is discharged a little by little, forming layers corresponding to cross-sectional shapes of the aimed structure. After discharged, the molding material is allowed to cool and cure. Thus, the softened or melted molding material can be further deposited on the cured molding material. By repeating the deposition, a three-dimensional layered structure can be precisely molded.

For instance, when the molding material is deposited and then softened or melted, it can be done in the following procedures: the molding material is supplied to the supply device, with the molding material being in the original powder form or in a form of slurry with the molding material dispersed in a suitable dispersion medium; while the supply device is moved in the X-axis and Y-axis directions at a high speed and the molding table is suitably elevated in the Z-axis direction, the molding material is deposited a little by little in layers on the molding table; subsequently, for instance, by an indirect heating means (e.g. radiation) with infrared light, UV light, laser light, etc., the molding material is heated until softened or melted only over the area corresponding to a cross section of the aimed structure. When the molding material is prepared as a slurry, the dispersion medium can be removed by drying such as natural drying or by such heating. The softened or melted molding material is allowed to cool and cure after a certain time. Thus, the molding material in the powder form can be further deposited on the cured molding material. By repeating the deposition, a three-dimensional layered structure can be precisely molded.

When the molding material in the powder form is deposited and then melted, it is preferable to use a finer and highly fluid powder as the molding material.

For instance, the fluidity of the molding material in the powder form can be accessed by the angle of repose. The angle of repose is an index that can indicate the fluidity of a powder. Since the angle of repose depends also on the powder's particle sizes (average particle diameter), etc., it cannot be completely generalized, however, in general, the higher the powder's fluidity is, the smaller the angle of repose is; a powder with poor fluidity may have a large angle of repose. In the art disclosed herein, for instance, the angle of repose is preferably 45° or smaller, more preferably 35° or smaller, or most preferably 30° or smaller. The minimum angle of repose is not particularly limited. For example, from the standpoint of reducing scattering, etc., the angle of repose can be 10° or larger, for instance, 20° or larger.

When the molding material is a fine powder, it can be more easily softened or melted by indirect heating or a more precise 3D structure can be molded. From such a standpoint, the average particle diameter is preferably 40 µm or smaller. It is more preferably 30 µm or smaller, or yet more preferably 20 µm or smaller. The minimum average particle diameter is not particularly limited. To readily obtain good fluidity, it can be, for instance, 5 µm or larger.

As used herein, the "angle of repose" is defined as the base angle determined from the diameter and height of a cone of deposits formed when a molding material is dropped through a funnel at a certain height onto a horizontal base plate. The angle of repose can be determined based on "Alumina powder—Part 2: Determination of physical properties—2: Angle of repose," JIS R 9301-2-2:1999.

For example, when the molding material is softened or melted while being deposited, the deposition and indirect heating of the molding material can be carried out at the same time in the method where the molding material in the powder form is deposited and then melted.

(Structures)

By this, without the use of a mold, a structure can be molded from the molding material at a low temperature. In general, differences in density arise easily between resin materials and non-resinous materials such as ceramic materials and metal materials. Accordingly, between particles formed of a resin material and a non-resinous material such as a ceramic material or a metal material, the one with a higher density moves downward while the other with a lower density moves upward. Thus, for instance, if a fluid molding material is put in a mold in one portion, the uniformity of the resin material and the non-resinous material is likely to be lost through the molding process, leading to the likely occurrence of irregularities and gradients in properties of the structure as well.

On the other hand, in the art disclosed herein, the molding material is deposited with heating. Thus, it is possible to reduce the loss of uniformity between the resin material and the non-resinous material in the structure or the occurrence of irregularities and gradients in properties. In particular, as in the granulated powder or the composite powder, the resin material and the non-resinous material are united in the molding material and this state can be mostly maintained through the molding process. By this, a more uniform structure can be obtained.

Whether or not the resulting structure is uniform can be judged based on the uniformity index N determined about the structure as described below although it is not necessarily limited to this. The uniformity index N can be determined by the following method. In the art disclosed herein, the porosity Rn of the structure is measured at 12 different locations (i.e. n=12) by image analysis. The variance of the resulting porosity Rn is divided by the average value of the porosities Rn to obtain the uniformity index N.

Here, for the porosity, the porosity based on image analysis described above can be used. The variance can be determined as the half the difference between the maximum porosity Rn ($Rn_{max}$) and the minimum ($Rn_{min}$), that is ($Rn_{max}-Rn_{min}$)/2.

In the art disclosed herein, the level of variance of porosity Rn is processed to be dimensionless for evaluation.

In the art disclosed herein, when the uniformity index N is below 0.2, the structure is judged uniform. In a highly uniform material, the non-resinous material which is relatively poorly moldable and the resin material which can be easily molded may be sufficiently mixed. Thus, even if the poorly moldable non-resinous material is included, by controlling the molding process in the moldable temperature range, a structure can be easily molded with favorable properties. The uniformity index N is more preferably 0.18 or lower, yet more preferably 0.14 or lower, or particularly preferably 0.1 or lower. When the uniformity index N is 0.2 or higher, the structure can be determined nonuniform.

The boundary value (0.2 here) of the uniform/nonuniform judgement based on the uniformity index N can be changed, for instance, in accordance with the details, accuracy of shape, etc., required of the structure.

The structure thus molded may favorably maintain the properties of the resin material and the non-resinous material (metal material and/or ceramic material) contained in the molding material. Thus, it is preferable that the functionalities of these resin material and non-resinous material (metal material and/or ceramic material) are about the same, enhanced, or decreased little in the structure.

For instance, with respect to the antibacterial activity, the antibacterial activity value is preferably 2.0 or higher in the structure as well. The antibacterial activity value is more preferably 3.0 or higher, or yet more preferably 5.0 or higher.

In a desirable embodiment, the difference may be small between the antibacterial activity values of the resin material and non-resinous material and the antibacterial activity value of the structure. More specifically, the difference in antibacterial activity value is preferably 1.5 or smaller, more preferably 1.0 or smaller, or particularly preferably 0.5 or smaller.

With respect to the color tone, for instance, when the color tones of the materials are desired to be reflected as they are or similarly in the structure, the change in color tone between the materials and the structure may be small in a desirable embodiment. The change in color tone between the material having the color tone and the structure can be assessed, for instance, by color differences. The index related to the color differences are not particularly limited. For instance, it can be assessed by the lightness difference $\Delta L$ ($\Delta L^*$) being the difference in CIE lightness $L^*$ or the ab hue difference $\Delta ab$ (or $\Delta H^*_{ab}$) specified in JIS Z 8730:2009 as described earlier.

From the standpoint of favorable reflection of the desired material color (especially the lightness) in the structure, for instance, the lightness difference $\Delta L$ is preferably 22 or less, more preferably 20 or less, or particularly preferably 18 or less (e.g. 15 or less).

From the standpoint of favorable reflection of the desired material color (especially the hue) in the structure, the hue difference $\Delta ab$ is preferably 10 or less, more preferably 8 or less, or particularly preferably, for instance, 5 or less.

For instance, when the hardness of the materials is desired to be reflected as it is or comparably in the structure, it is desirable that the hardness is maintained in the structure as well. Indication of hardness is not particularly limited since various indices can be considered. For instance, in a desirable embodiment, Vickers harness is typically used and the Vickers hardness ratio (hardness ratio) of the structure to the material is 1 or higher, that is, the hardness is maintained or increased. The hardness ratio can be determined based on the Vickers hardness test method specified in JIS Z 2244:2009 and JIS R1610:2003. For instance, in particular, the favorably used value can be determined as follows: using a commercial hardness tester, a test load is applied on the surface of a specimen by a suitable indenter and the ratio value can be determined from the diagonal line of the resulting indentation mark. The hardness ratio is preferably 2 or higher, or more preferably 3 or higher. The maximum hardness ratio is not particularly limited.

For instance, when the glossiness of the materials is desired to be reflected as it is or comparably in the structure, the glossiness may stay on the structure in a desirable embodiment. In typical, as an index capable of evaluating favorable luxurious gloss, the glossiness (measurement angle 20°) can be used. The glossiness (or the gloss value) is desirably 50 or higher. For the glossiness, the glossiness of the structure surface can be used, which is measured at an angle of 200 using a commercial glossmeter based on the specular glossiness measurement method described in JIS Z 8741:1997. From the standpoint of providing the structure with luxurious gloss, the glossiness is more preferably 70 or higher, yet more preferably 80 or higher, or particularly preferably 90 or higher (e.g. 100 or higher). The maximum glossiness is not particularly limited.

Along with working examples related to this disclosure, the characteristics of this disclosure are further described. The present disclosure is not to be limited to the working examples described below.

Example 1

(Molding Materials)

As the resin material, was obtained a powdered polyvinyl phenol (PVP, $D_{50}$ 2 μm, Mw ~10,000, true density 12 g/ml, moldable temperature range 160° C. to 230° C.). As for the non-resinous material, were obtained titania powder ($TiO_2$, $D_{50}$ 5 μm) and alumina powder ($Al_2O_3$, $D_{50}$ 5 μm) as ceramic materials as well as cobalt powder (Co, $D_{50}$ 3 μm) and iron powder (AISI4140 steel, $D_{50}$ 8 μm) as metal materials. These materials were prepared in the combinations and forms shown in Table 1 to obtain molding materials (building materials) 1 to 11.

In the molding materials 4 to 11, the resin material and the non-resinous material (a ceramic material or a metal material) were mixed or formulated at 1:1 volume ratio.

In Table 1, "Liquid" indicates that it is a resin dispersion obtained by dissolving (or dispersing) the resin material in an organic solvent (ethyl cellosolve).

In Table 1, "Granulated" indicates that it is a granulated powder obtained by uniting the resin material and non-resinous material by granulation with a binder.

In Table 1, "Clad" indicates that it is a composite powder formed of coated particles obtained by coating the surfaces of the non-resinous particles with the resin material.

In Table 1, "Slurry" indicates that it is in a slurry form obtained by dispersing a powder formed of the resin material and a powder formed of the non-resinous material to 5% by volume in ethanol as the dispersion medium.

In Table 1, "Powder mixture" indicates that it is a powder mixture obtained by mixing a powder formed of the resin material and a powder formed of the non-resinous material.

(Molding Method)

The molding materials 1 to 11 obtained were supplied to substrate surfaces by the molding methods shown in Table 1 below to form thin-layer structures. For the substrate, was used a SS400 steel plate (70 mm×50 mm×2.3 mm) blasted with alumina #40 abrasive.

In Table 1, "Coated" indicates that the PVP was dissolved in toluene as the solvent to prepare a PVP composition, a substrate surface was spray-coated with the PVP composition at room temperature (25° C.), and the PVP composition was heated along with the substrate to 100° C. and then to 210° C. to undergo thermal curing to form a 50 μm thick layer structure.

In Table 1, "TS A" indicates that using a commercial cold spray (CS) system (DYMET available from OCPS, Russia), the molding material obtained as the thermal spraying material was cold-sprayed to form a 40 μm thick layer structure. The CS was carried out using air as the working gas at a working gas pressure of 0.7 MPa, a working gas heater temperature of 500° C., a spray distance of 20 mm, a moving speed of spray gun of 5 mm/sec, with the spray powder supplied at 15 g/min. By the CS method, molding materials are heated to about 150° C. up to 500° C. The temperatures at which the molding materials were heated in the CS system were estimated from the temperatures of the molding materials measured with an infrared thermometer, immediately after they were deposited on the substrates.

In Table 1, "TS B" indicates that using an commercial atmospheric plasma spray (AP) system (SG-100 available from Praxair Surface Technologies), the molding material obtained as the thermal spraying material was atmospheric plasma sprayed to form a 40 μm thick layer structure. The plasma was generated using argon at 50 psi (034 MPa) and helium at 50 psi (034 MPa) as the plasma working gas at a voltage of 37.0 V and a current of 900 A. The thermal spraying conditions were as follows: spray distance 120 mm, moving speed of spray gun 5 mm/s with the spray powder supplied at 20 g/min. By the AP spraying method, molding materials are heated to about 1000° C. or higher. The temperatures at which the molding materials were heated in the AP system were estimated from the temperatures of the molding materials measured with an infrared thermometer, immediately after they were deposited on the substrates.

(Evaluation of Structures)

[Antibacterial Activity]

With respect to the structures obtained above, antibacterial activities were tested based on the antibacterial activity test method specified in JIS Z2801:2010. In particular, *Staphylococcus aureus* (NBRC 12732) was used as the test bacterium; a test bacterium solution was dropped to 5 cm by 5 cm cut-outs (specimens) of the structures and to the substrate (reference) with the unprocessed surface; these were covered with film and incubated in culture dishes at 35° C. for 24 hours; the number of live bacteria was then counted. The number of bacteria in the reference after 24 hour incubation was divided by the number of bacteria of each specimen after 24 hour incubation and the quotient was converted to the logarithm to determine the antibacterial activity value. The results are shown in the column headed "Antibacterial activity value" in Table 1. Antibacterial activity can be found effective when the antibacterial activity value is 2.0 or greater, that is when the death rate is 99% or higher.

[Hardness]

The hardness of each structure obtained above was measured based on the Vickers harness test method specified in JIS Z 2244:2009 and JS R1610:2003. In particular, using a micro hardness tester (HMV-1 available from Shimadzu Corporation), Vickers hardness (Hv 0.2) was determined from the indentation marks resulted when a test load of 1.96 N was applied on the surfaces of the structure by a diamond indenter having an apical angle of 136°. Vickers hardness (Hv 0.2) was determined in the same manner with respect to the surface of the same PVP bulk body as the one used above. The hardness ratio was determined based on the equation shown below. The results are shown in the columns headed "Hardness ratio" in Table 1.

Hardness ratio=(Vickers hardness of structure)/(Vickers hardness of PVP bulk body)

[Uniformity]

As described below, the porosity of each structure obtained above was measured to determine the uniformity index N. In particular, 12 cross-sectional images (490×) were taken of each structure with a microscope. For each image, from the surface areas of the pores and the entire cross section, the proportion of pores in the entire cross section was determined as the porosity. For the analysis, image processing software (e.g. IMAGE PRO available from Nippon Roper K. K.) was used. The resulting 12 porosities of each structure were found to be normal and homoscedastic. With respect to these porosities, the variance was divided by the average value to determine the unifor-

TABLE 1

| No. | Resin | Ceramic | Metal | Form | Molding method | Antibacterial activity value | Hardness ratio | Uniformity |
|---|---|---|---|---|---|---|---|---|
| 1 | PVP | — | — | Liquid | Coated | 5.5 | 1 | 0.12 |
| 2 | PVP | — | — | Granulated | TS A | 5.5 | 1 | 0.12 |
| 3 | PVP | — | — | Granulated | TS B | 0 | 1 | 0.20 |
| 4 | PVP | $Al_2O_3$ | — | Granulated | TS A | 4.8 | 3 | 0.10 |
| 5 | PVP | $Al_2O_3$ | — | Granulated | TS B | 0 | 3 | 0.21 |
| 6 | PVP | $Al_2O_3$ | — | Clad | TS A | 4.7 | 3 | 0.16 |
| 7 | PVP | $Al_2O_3$ | — | Slurry | TS A | 4.7 | 2 | 0.15 |
| 8 | PVP | $Al_2O_3$ | — | Powder mixture | TS A | 4.7 | 2 | 0.24 |
| 9 | PVP | $TiO_2$ | — | Granulated | TS A | 5.3 | 3 | 0.11 |
| 10 | PVP | — | Co | Granulated | TS A | 5.4 | 2 | 0.10 |
| 11 | PVP | — | Fe | Granulated | TS A | 0 | 2 | 0.10 | mity index N. The resulting values of uniformity index N are shown in the column headed "Uniformity" in Table 1.

As shown in Table 1, Structure No. 1 formed by the coating method essentially consists of the thermally cured PVP. Thus, the hardness was as low as 1. However, the antibacterial activity inherent to PVP was maintained as it was in the structure and it was confirmed that the structure was obtained with excellent antibacterial activity. As it was formed solely of PVP, the structure was obtained with high uniformity, having a uniformity index below 02.

Structure No. 2 was formed by thermal spraying A (cold spraying) at a low temperature and the antibacterial activity inherent to PVP was maintained in the structure as well. However, because the structure itself was formed solely of thermally cured PVP, the hardness was approximately equal to that of No. 1. Structure No. 2 was also found to have great uniformity as it was formed solely of PVP.

On the other hand, because Structure No. 3 was molded by thermal spraying B (atmospheric plasma spraying) at a high temperature, PVP was altered during the molding process, resulting in a lack of antibacterial activity in the structure. Since the structure was formed solely of altered PVP, the hardness was about equal to that of No. 1 and excellent uniformity was also observed.

Structure No. 4 was formed by low-temperature thermal spraying A, using the powder granulated from PVP and alumina powder. In the structure, while the antibacterial activity decreased corresponding to the alumina powder added, sufficiently high antibacterial activity was maintained. The structure was found to have excellent uniformity with a uniformity index of 0.1 due to the hard alumina powder added, the granulated powder form, and the homogeneity of PVP and alumina maintained during the thermal spraying process. With a hardness ratio of 3, the structure was found to have significantly increased hardness (i.e. three times that of the PVP bulk body).

Structure No. 5 was formed with the powder granulated from PVP and alumina powder, but by high-temperature thermal spraying B. In the structure, PVP was altered and did not show antibacterial activity, similarly to No. 3. The altered PVP was found to cause significant degradation of uniformity during the thermal spraying process. However, because of the hard alumina powder added, a high hardness value was obtained with the structure, similarly to No. 4.

Structure No. 6 was formed by low-temperature thermal spraying A, using the clad powder obtained by coating the surface of alumina powder with PVP. While the antibacterial activity decreased corresponding to the alumina powder added, the structure was found to maintain sufficiently high antibacterial activity, comparably to No. 4. With a uniformity index below 02, the homogeneity of PVP and alumina was maintained in the clad powder even in the thermal spraying process, confirming the excellent uniformity of the structure. Because of the hard alumina added, the structure had high hardness comparable to that of No. 4.

Structure No. 7 was formed by low-temperature thermal spraying A, using the slurry prepared from the molding material. Structure No. 8 was formed by low-temperature thermal spraying A, using a powder mixture of PVP and alumina. While the antibacterial activity decreased corresponding to the alumina powder added, both examples were found to maintain sufficiently high antibacterial activity, comparably to No. 4. With their hardness ratios being at 2, the hardness of the structures somewhat decreased from that of No. 4. However, because of the hard alumina powder added, it was harder than No. 1. Based on the uniformity data, Structure No. 7 formed from the PVP/alumina powder slurry had excellent uniformity. On the other hand, Structure No. 8 formed with the simple powder mixture resulted in somewhat poorer uniformity in this embodiment.

With respect to Structure No. 9, the molding material was prepared, using the titania powder in place of the alumina powder in No. 4. When the ceramic material was changed to titania, the antibacterial activity increased. With respect to the uniformity and hardness of the structure, good results comparable to No. 4 were obtained as well.

As for Structure No. 10, the molding material was prepared using the cobalt powder in place of the alumina powder in No. 4. When the alumina as the ceramic material was replaced with cobalt metal, the antibacterial activity further increased. Because of the somewhat poorer bonding strength at the interface between the cobalt powder and PVP, the structure's hardness decreased from No. 4, with a hardness ratio of 2. However, due to the hard cobalt powder added, it was harder than No. 1. With respect to the uniformity of the structure, good results comparable to No. 4 were obtained.

For Structure No. 11, the molding material was prepared using the iron powder in place of the alumina powder in No. 4. Iron (Fe) can be a nutrient for bacteria. In comparison between No. 2 and No. 4, it was found that by changing alumina as the ceramic material to iron metal, the antibacterial activity of PVP can be completely lost. In other words, the resulting structure was suited for carrying bacteria. Because of the somewhat poorer bonding strength at the interface between the iron powder and PVP, the structure's hardness decreased from No. 4, with a hardness ratio of 2. However, due to the hard cobalt powder added, it was harder than No. 1. With respect to the uniformity of the structure, good results comparable to No. 4 were obtained.

From the above, it has been confirmed that by using the molding material disclosed herein and molding a structure by the molding method disclosed herein, the structure can be molded with uniform quality. It has been shown that after molded, the structure can still have the antibacterial activity of the material(s) forming the molding material. In the molding material disclosed herein, the non-resinous material and resin material are sufficiently mixed. Thus, it has been shown that only by controlling the molding temperature in the moldable temperature range of the molding material, a structure can be molded with favorable properties as compared to conventional materials.

Example 2

(Molding Materials)

Subsequently, with respect to structures molded with the molding materials disclosed herein, to determine if they could retain the color tones of the materials forming the molding materials, the structures were subjected to the assessment described below. In particular, using polypropylene powder (PP, $D_{50}$ 3 µm, melting point 130° C., true density ~0.9 g/cm$^3$) as the resin material and iron-based ceramic powder ((Fe,Al,Mg)Cr$_2$O, $D_{50}$ 5 µm) being the ceramic material as the non-resinous material, molding materials 1 to 6 were obtained in the combinations and forms shown in Table 2 below.

In the molding materials 2 to 5, the resin material and ceramic material were mixed or formulated at 1:1 volume ratio.

(Molding Method)

The resulting molding materials 1 to 6 were supplied to substrate surfaces by the molding methods shown in Table 2 below to form thin-layer structures. For the substrate, was used a SS400 steel plate (70 mm×50 mm×2.3 mm) blasted with alumina #40 abrasive.

The items in the column headed "Form" in Table 2 are the same as in Table 1.

The items in the column headed "Molding method" in Table 2 are the same as in Table 1.

TABLE 2

| No. | Molding material | | | | Molding method | Δab | ΔL | Gloss value |
|---|---|---|---|---|---|---|---|---|
| | Resin | Ceramic | Metal | Form | | | | |
| 1 | — | Fe-based | — | Powder | TS B | 26 | 30 | 200 |
| 2 | PP | Fe-based | — | Granulated | TS A | 2 | 12 | 95 |

TABLE 2-continued

| | Molding material | | | Molding method | Δab | ΔL | Gloss value |
|---|---|---|---|---|---|---|---|
| No. | Resin | Ceramic | Metal | Form | | | | |
| 3 | PP | Fe-based | — | Granulated | TS B | 14 | 24 | 88 |
| 4 | PP | Fe-based | — | Clad | TS A | 3 | 13 | 87 |
| 5 | PP | Fe-based | — | Powder mixture | TS A | 9 | 18 | 73 |
| 6 | PP | — | — | Granulated | TS A | 4 | 15 | 32 |

(Evaluation of Structures)
[Color Differences]

The color (lightness (L), hue (a) and saturation (b)) of the surface of each structure obtained above was analyzed by a Hunter color meter (SE-2000, Nippon Denshoku Industries Co., Ltd.). The hue difference Δab and lightness difference ΔL were determined, relative to a body molded from the molding material that had been used at a temperature of 200° C. by an injection molding machine. These results are shown in the columns headed "Δab" and "ΔL" in Table 2. It is noted that the molding temperature of 200° C. with respect to the injection molding machine is the recommended molding temperature for the PP used. In particular, although no specific data are shown here, it has been found that a structure formed by depositting the PP at 200° C. has a uniformity index N below 0.2.

[Glossiness]

The glossiness of the respective structures obtained above was measured at an angle of 20° by a glossmeter (GM-268 PLUS available from Konica Minolta Optics). The results are shown in the column headed "Gloss value" in Table 2.

As shown in Table 2, Structure No. 1 formed from the iron-based ceramic powder by high-temperature thermal spraying B had a high degree of glossiness and was highly shinny; however, the original chestnut color tone of the Fe-based ceramic material turned black and the color was damaged during the molding process.

Structure No. 6 was formed with solely the PP powder by low-temperature thermal spraying A. Structure No. 6 showed a relatively small color difference upon thermal spraying; however, since it was formed solely of the resin material, the gloss value was the lowest among all examples. In other words, this structure is not suited for applications requiring certain levels of aesthetic appearance including shininess and glossiness.

Structure No. 2 was formed by low-temperature thermal spraying A, using the powder granulated from the iron-based ceramic powder and PP powder. Due to the PP added, the glossiness was lower than No. 1, but the value was still sufficiently high as compared to No. 6. Since it was formed by low-temperature thermal spraying A, the color difference was small and the color tone of the iron-based ceramic was mostly maintained in the structure.

Structure No. 3 was formed by high-temperature thermal spraying B, using the same molding material as No. 2. Thus, both the iron-based ceramic and PP were altered in the granulated powder and the glossiness decreased further as compared to No. 2, giving rise to a large color difference.

Structure No. 4 was formed by low-temperature thermal spraying A, using the clad powder of the iron-based ceramic powder and PP. As for the clad powder, when compared to the granulated powder, the uniformity of the iron-based ceramic powder and PP was somewhat poorer, and the glossiness decreased from No. 2, but it was still a sufficiently high value as compared to No. 6. The color difference was small, indicating that the color tone of the iron-based ceramic was well maintained in the structure.

Structure No. 5 was formed by low-temperature thermal spraying A, using the powder mixture of the iron-based ceramic powder and PP powder. When compared to the granulated powder, the uniformity of the powder mixture somewhat decreased during the transfer because of the difference in density between the iron-based ceramic and PP. Accordingly, the gloss value decreased further in the structure. However, when heated, the PP powder did not undergo discoloration, etc., and had a relatively small color difference, whereby the color tone of the iron-based ceramic was well maintained in the structure.

The present disclosure has been described in detail above, but these embodiments are merely for illustrations. The disclosure herein includes various modifications and changes made to the specific embodiments illustrated above.

The invention claimed is:

1. A method for molding a structure without a mold, comprising:
    obtaining a powdered molding material that comprises granulated particles formed from resin particles and non-resinous particles bonded to each other, the non-resinous particles formed of at least one material selected from the group consisting of metals and ceramics; and
    depositing the molding material in layers on a molding table; and
    heating until the layers of the molding material soften or melt only over an area corresponding to a cross section of an aimed structure;
    the molding material being in a softened or molten state in a temperature range between the resin material's minimum molding temperature and maximum molding temperature+100° C.,
    the minimum molding temperature is the lowest heater temperature at which the resin material can be molded at an injection pressure of 3500 psi by an injection molding machine, and
    the maximum molding temperature is the highest heater temperature at which the resin material can be molded at an injection pressure of 3500 psi by the injection molding machine.

2. The structure-molding method according to claim 1, wherein the molding material is deposited with the molding material being dispersed in a dispersion medium.

3. The structure-molding method according to claim 1, wherein the molding material is deposited by a 3D printer to form the structure.

4. The structure-molding method according to claim 1, wherein during the heating step, the molding material is heated to the temperature range between the resin material's minimum molding temperature and maximum molding temperature+100° C.

5. The structure-molding method according to claim 1, wherein the depositing step and the heating step are repeated to obtain the aimed structure.

* * * * *